United States Patent [19]

Hsu

[11] 4,160,465
[45] Jul. 10, 1979

[54] EMERGENCY WATER LEAK PLUG

[76] Inventor: Charles J. Hsu, Box 460, Grand Central Station, New York, N.Y. 10017

[21] Appl. No.: 788,784

[22] Filed: Apr. 19, 1977

[51] Int. Cl.² ............................................. F16L 55/18
[52] U.S. Cl. ............................ 138/97; 285/DIG. 26
[58] Field of Search ..................... 206/0.5, 221, 568; 33/126.7 R; 285/DIG. 26; 138/79, 89, 98, 97; 264/36

[56] References Cited

U.S. PATENT DOCUMENTS

| | | | |
|---|---|---|---|
| 3,211,574 | 10/1965 | Shannon | 138/97 |
| 3,745,659 | 7/1973 | Hsu | 33/126.7 R |
| 3,797,805 | 3/1974 | Nielsen | 285/DIG. 26 |
| 4,058,234 | 11/1977 | Vrolyk | 138/97 |

*Primary Examiner*—Robert I. Smith

[57] ABSTRACT

A temporary plug for plugging a leaking hole in a tank or other vessel containing water; the plug consisting of a porous fabric bag partly filled with a dry powder having the characteristic which, upon getting wet, expands several times its volume so to tightly seal the hole and prevent further leakage.

1 Claim, 11 Drawing Figures

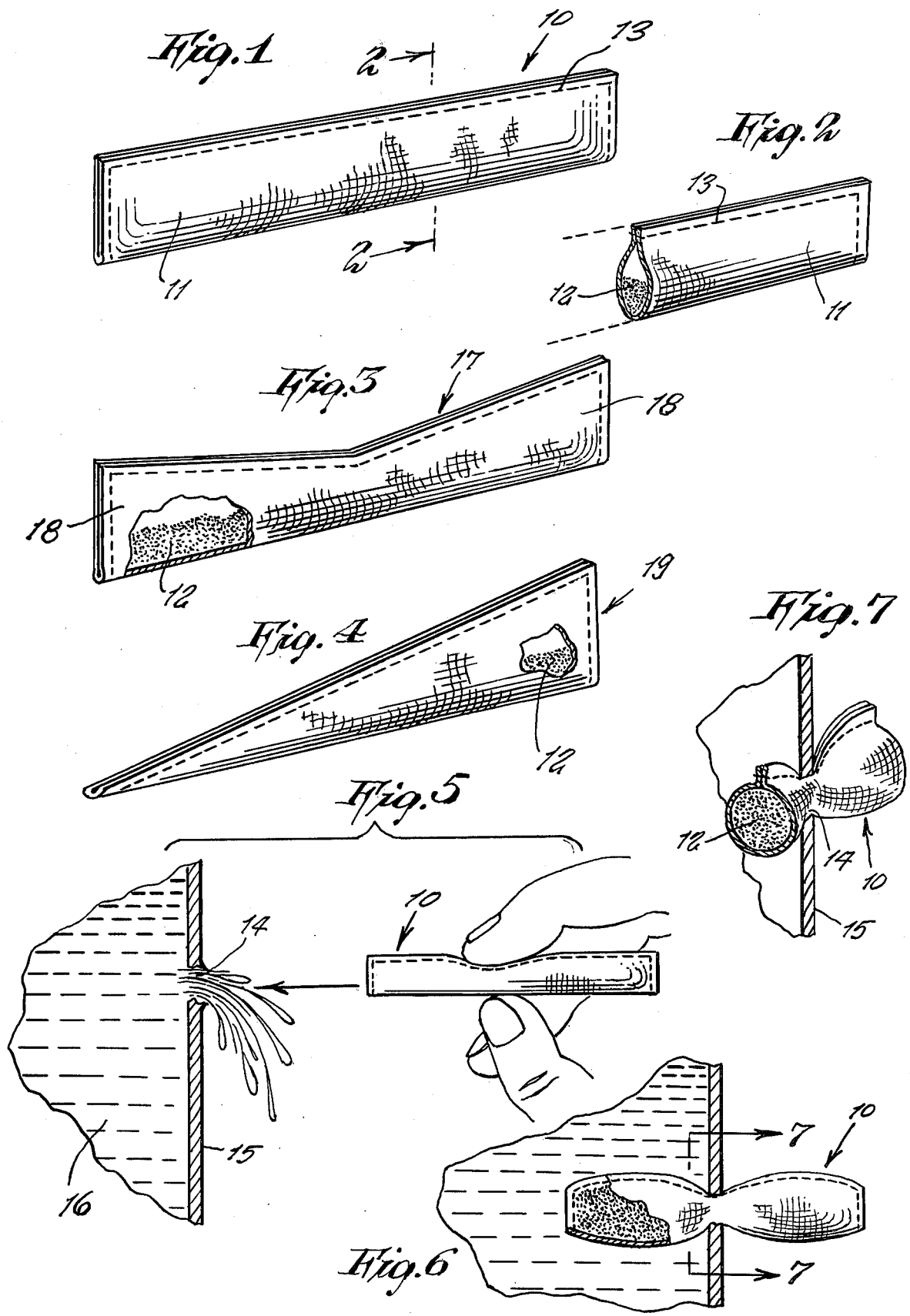

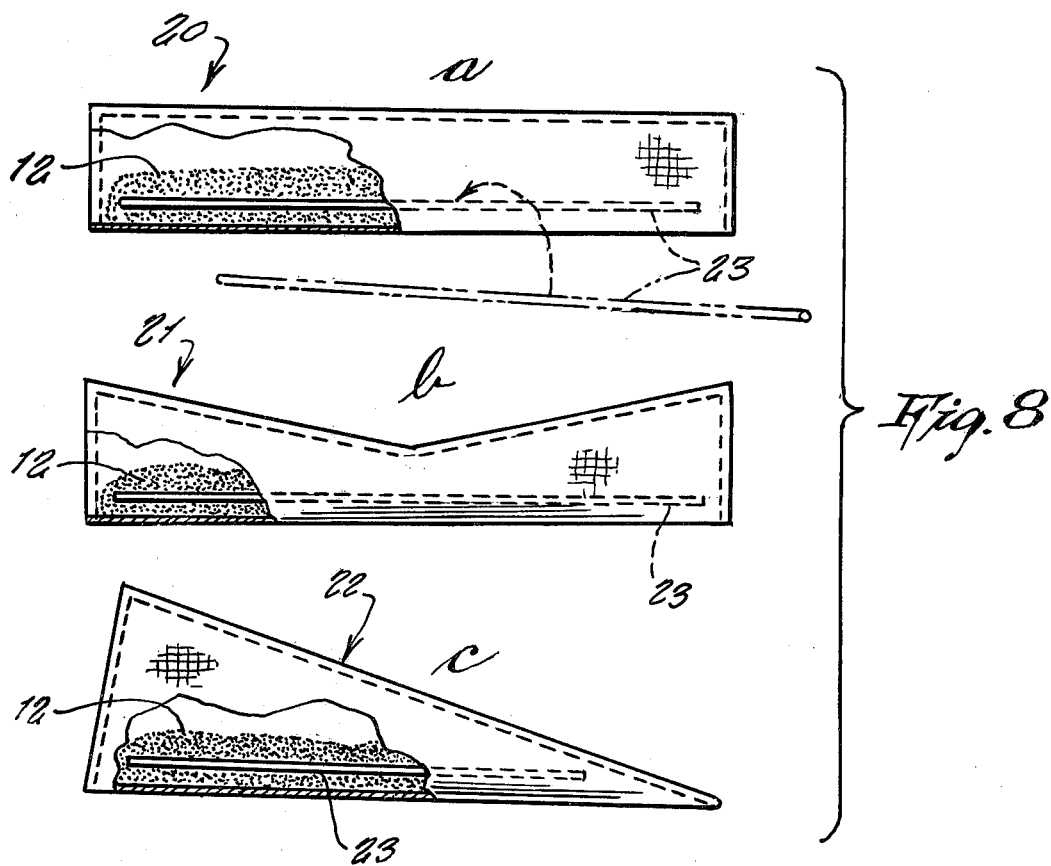
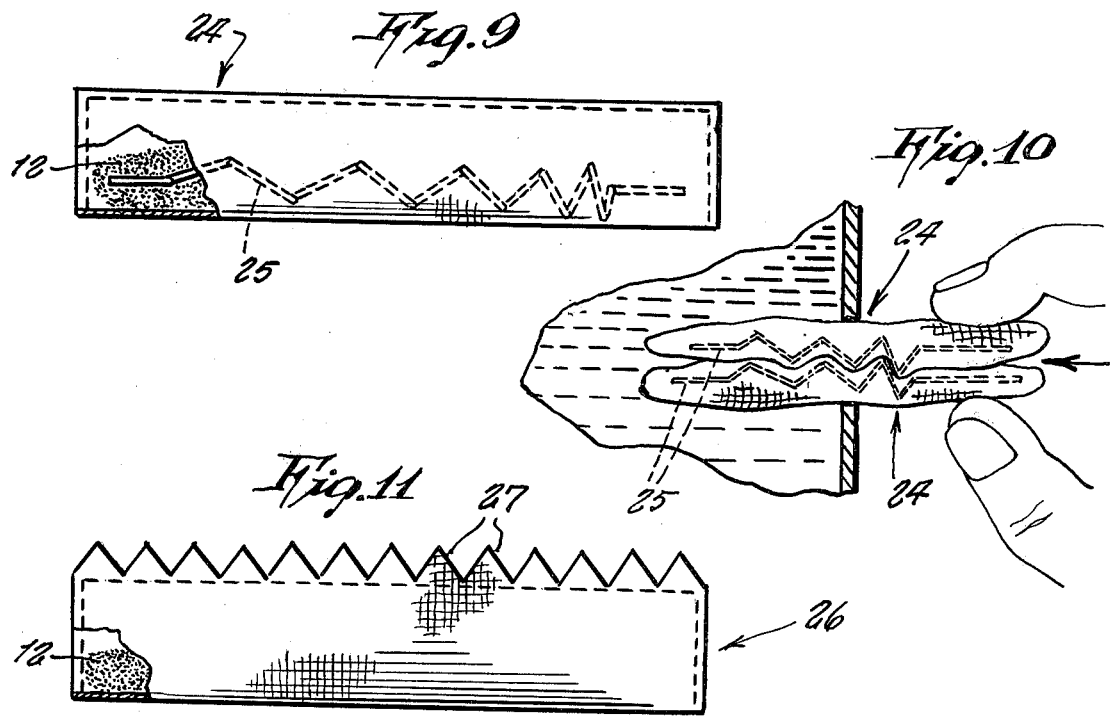

EMERGENCY WATER LEAK PLUG

This invention relates generally to plugs for plugging water leaks.

A principal object of the present invention is to provide a new type of plug which automatically expands in size when pushed into a leaking hole so to tightly seal the hole from further leakage of water therethrough.

Another object is to provide a water leak plug which automatically shapes itself to the particular shape of a leaking hole.

Still another object is to provide a water leak plug which by being of elongated shape can thus extend outward of both ends of a hole so that in addition to forming a tight seal within the hole interior, also forms, after expanding, a bulge at each end that firmly locks the plug in position from falling out of the hole.

Yet another object is to provide a water leak plug for temporary emergency repair of a water leak, prior to making a permanent repair thereof, and wherein the water leak plug can be re-used over and over again after having been dried out between uses, during which drying out period it shrinks back to original size.

Yet another object is to provide an emergency water leak plug which requires no tools nor any special skill to use, but which is quick and easy to manipulate by anyone.

Yet further objects are to provide an emergency water leak plug which is simple in design, inexpensive to manufacture, rugged in construction and efficient in operation.

These and other objects will be readily evident upon a study of the following specification and the accompanying drawing wherein:

FIG. 1 is a perspective view of one design of the invention.

FIG. 2 is a similar view thereof shown in cross section as viewed on line 2—2 of FIG. 1.

FIG. 3 is a perspective view of another design of the invention.

FIG. 4 is a similar view of yet another design thereof.

FIG. 5 illustrates the plug in position for installation in a leaking hole of a water tank.

FIG. 6 is a view thereof after the plug is inserted in the hole and is expanded.

FIG. 7 is a perspective cross sectional view taken on line 7—7 of FIG. 6.

FIG. 8 illustrates side views of the model designs shown in FIGS. 1 to 4, and which are modified to include a stiff wire therewithin.

FIG. 9 is a side view of still another modified design in which the stiff wire is spiral shaped.

FIG. 10 illustrates two plugs of the type shown in FIG. 9 being inserted together in a larger leaking hole.

FIG. 11 is a side view of still another design wherein the plug has a saw-toothed edge.

Referring now to the drawing in greater detail, and more particularly to FIGS. 1 and 2 thereof at this time, the reference numeral 10 represents an emergency water leak plug according to the present invention wherein there is an elongated, rectangular bag 11 partly filled with a quantity of finely pulverized powder 12 of Sterculia Lychnophera Hance, which is derived from a botanical plant growing in the Orient, and which powder has the characteristic of expanding over fifteen times its size in water by absorption thereof. The bag is made from a folded over piece of woven cotton fabric and which is stitched on three sides by a thread 13 so to enclose the powder. The bag fabric is sufficiently porous so water can enter therethrough.

In use, as shown in FIG. 5, the bag is inserted into a leaking hole 14 of a tank, pipe or other vessel 15 containing water 16. The powder 12 gradually absorbs water and slowly swells up so to seal the hole with a pressure attainable up to over three pounds per square inch. The plug serves as a temporary seal prior to making a permanent repair, and can be dried out so to shrink back to original size for subsequent re-use.

In FIG. 3, a plug 17 is the same as plug 10 except that the bag tapers along one edge from a center to form enlarged opposite ends 18 of the bag.

In FIG. 4, a plug 19 is likewise a same as bag 10 except that it is triangular shaped.

In FIG. 8, plugs 20, 21 and 22 are shown and which are the same as the above described plugs except that they additionally each include a stiff rod 23 therewithin which may be made either of a metal wire, wood or the like and which serves as a stiffener for the bag so to make it rigid for insertion into a leaking hole.

In FIG. 9, a plug 24 is the same as the plug 20 in FIG. 8 except that the stiff rod comprises a spiral wound stiff wire 25 with spiral turns progressively spread toward one end. In use, two or more plugs can be inserted into a larger hole as shown in FIG. 10, and the spiral wires of the different bags interfit each other so to lock the bags together and prevent any to fall out of the hole before the powder swells up.

In FIG. 11, a plug 26 has a saw-toothed edge 27 cut by pinking shears on the bag 11, so the saw-toothed edges of several bags interlock when being inserted into a large hole.

Thus, different models of the invention are presented.

While various changes may be made in the detail construction, it is understood that such changes will be within the spirit and scope of the present invention as is defined by the appended claims.

I claim:

1. An emergency water leak plug, comprising in combination, an elongated bag of porous fabric, said bag being partly filled with a powder of Sterculia Lychnophora Hance which has the characteristic of substantially swelling up in water, said bag additionally including an elongated stiffener member therewithin, said stiffener member comprising a spiral shaped stiff wire, said bag being polygonic in shape, and said spiral shaped stiff wire member having spiral turns progressively spread apart toward one end.

* * * * *